US009406144B2

United States Patent

(12) United States Patent
Schilffarth et al.

(10) Patent No.: US 9,406,144 B2
(45) Date of Patent: Aug. 2, 2016

(54) REAL-TIME TRACKING AND CORRELATION OF MICROSPHERES

(71) Applicant: LUMINEX CORPORATION, Austin, TX (US)

(72) Inventors: Adam Schilffarth, Cedar Park, TX (US); Matthew Fisher, Austin, TX (US)

(73) Assignee: LUMINEX CORPORATION, Austin, TX (US)

( * ) Notice: Subject to any disclaimer, the term of this patent is extended or adjusted under 35 U.S.C. 154(b) by 168 days.

(21) Appl. No.: 14/200,322

(22) Filed: Mar. 7, 2014

(65) Prior Publication Data

US 2014/0270371 A1 Sep. 18, 2014

Related U.S. Application Data

(60) Provisional application No. 61/790,327, filed on Mar. 15, 2013.

(51) Int. Cl.
*G06K 9/00* (2006.01)
*G06T 7/20* (2006.01)

(52) U.S. Cl.
CPC .............. *G06T 7/20* (2013.01); *G06K 9/00134* (2013.01); *G06T 2207/10016* (2013.01); *G06T 2207/10064* (2013.01)

(58) Field of Classification Search
CPC ............................ G02B 21/0076; G02B 21/16
See application file for complete search history.

(56) References Cited

U.S. PATENT DOCUMENTS

| | | | | |
|---|---|---|---|---|
| 4,900,934 A * | 2/1990 | Peeters | .............. | G01N 21/6458 250/461.1 |
| 6,444,992 B1 | 9/2002 | Kauvar et al. | .............. | 250/461.1 |
| 6,989,235 B2 | 1/2006 | Chapsky et al. | ............. | 435/6.16 |
| 2003/0086608 A1* | 5/2003 | Frost | .................... | G01N 15/147 382/173 |
| 2006/0108509 A1* | 5/2006 | Frangioni | ............ | A61B 5/0059 250/208.1 |

(Continued)

FOREIGN PATENT DOCUMENTS

WO WO 2006/138544 12/2006

OTHER PUBLICATIONS

O. Otto, F. Czerwinski, J. Gornall, G. Stober, L. Oddershede, R. Seidel, and U. Keyser, “Real-time particle tracking at 10,000 fps using optical fiber illumination,” Opt. Express 18, 22722-22733 (2010).*

(Continued)

*Primary Examiner* — Bhavesh Mehta
*Assistant Examiner* — Ian Lemieux
(74) *Attorney, Agent, or Firm* — Parker Highlander PLLC

(57) ABSTRACT

Methods and apparatuses for tracking and correlating particles include an optical detector that captures a first and a second image of the particles. A video detector is used to capture a plurality of video frames of the particles. The video detector captures the video frames of the particles at a rate faster than the rate at which images are captured by the optical detector to track the movement of particles. A first image position of a particle in the first image of the particles is identified, and then the first image position of the particle is correlated to a second image position of the particle in the second image using the plurality of video frames.

17 Claims, 10 Drawing Sheets

900

Start

902 Identify a first image in which particle positions may be determinable and a second image in which particle positions may not be determinable 904 Identify a first image position of a first particle in the first image 906 Transform the first image position from a position in an image coordinate system to a position in a video frame coordinate system to identify a first video frame position 908 Identify two video frames with the two time stamps that are closest to the time stamp of the second image 910 Identify the positions of two particles in the two identified video frames that are closest to the first video frame particle position 912 Interpolate the positions of the two particles in the two identified video frames to determine a second video frame position in the video frame coordinate system 914 Apply an inverse transform to the first particle's second video frame position to determine the first particle's second image position in the second image End

(56) References Cited

U.S. PATENT DOCUMENTS

2009/0253102 A1 10/2009 Porikli et al. .................... 434/6
2010/0046823 A1 2/2010 O Ruanaidh et al. ......... 382/133
2010/0134631 A1 6/2010 Voth et al. .................... 348/169
2011/0228069 A1* 9/2011 Mimura ................ C12M 23/48 348/79
2011/0284767 A1* 11/2011 Wolleschensky .... G02B 21/367 250/459.1
2012/0045748 A1 2/2012 Willson et al. ................... 435/5
2012/0064012 A1 3/2012 Zhang ......................... 424/9.61
2012/0101822 A1 4/2012 Dinerstein ................... 704/246
2012/0155725 A1 6/2012 Bathe et al. .................. 382/128
2012/0227473 A1 9/2012 Sinha .......................... 73/61.75

OTHER PUBLICATIONS

International Search Report and Written Opinion, issued in PCT/US2014/021607, dated Jun. 5, 2014.

* cited by examiner

REAL-TIME TRACKING AND CORRELATION OF MICROSPHERES

CROSS-REFERENCE TO RELATED APPLICATIONS

This application claims priority to U.S. Provisional Patent Application Ser. No. 61/790,327, filed Mar. 15, 2013, the contents of which are incorporated by reference herein.

BACKGROUND OF THE INVENTION

This invention relates to methods and apparatuses for motion tracking and image registration, and more particularly relates to real-time tracking and correlation of particles from images of the particles captured at discrete time intervals.

DESCRIPTION OF THE RELATED ART

Given a set of particle images that are captured at discrete time intervals where the elapsed time between images is too large to resolve individual random particle movement, identifying the same particle in each of the images may not be possible. For example, the location of a particular particle in a first image may, in a second image, be vacant or be occupied by a different particle because within the time between when the first image was captured and when the second image was captured the particles in the image may move. As such, it may be difficult to attribute measurements in two separate images to a common particle.

FIG. 1 is an illustration showing a result of random particle movement between two particle images captured at discrete time intervals. Particle image 110 may be an image captured at a time before particle image 120 is captured. As is evident from the two particle images, 110 and 120, the particle 111, in the time between when the first particle image 110 was captured and when the second particle image 120 was captured, has moved from its location on an imaging plane. Without the ability to track particle 111 during the time between when the first 110 and the second 120 particle images were captured, it may be difficult to correlate a measurement corresponding to particle 111 in image 110 to a measurement corresponding to particle 111 in image 120.

FIG. 2 is an illustration showing changes in particle locations in two separate images. Such changes in location may be due to system optics, even if the particles do not move. As with FIG. 1, measurements taken from a single particle may come from different areas of a detector.

SUMMARY OF THE INVENTION

Methods and apparatuses for tracking and correlating particles from images of the particles captured in discrete time intervals allows measurements to be taken from individual particles among a plurality of particles in a plurality of images. In addition to using a first optical detector to capture "classification" images (e.g., images directed to detecting optical signatures, such as fluorescence emission) of the particles, the system may include a second optical detector, herein referred to as a video detector, that captures frames at a rate faster than the rate at which images are captured by the first optical detector. Such a system is able to more closely track the movement of particles, and therefore is capable of more accurately identifying the same particles in a plurality of distinct images taken over a period of time. As a result, the system may improve the accuracy of data acquired from measurements performed on particles through a plurality of images.

For example, consider a fluorescence optical system for the detection of fluorescent particles in a droplet. Due to droplet surface characteristics, the particle movement within the droplet can be volatile. In order to achieve both a multiplex and high limit of detection, multiple "classification" images at different wavelengths may need to be captured. When capturing these images in succession with a single optical detector, several seconds may pass between the time the first image and the last image are captured due to moving parts (e.g., filter wheel, focal position) and/or capture integration time. It can, therefore, become difficult to correlate the positions of the particles in the first classification image with the positions of the particles in a subsequent classification image (e.g., a second, third, fourth, etc. image) due to the movement of the particles between image captures. The methods and apparatuses disclosed herein address this problem by tracking and correlating particles in images taken at discrete time intervals.

A method is disclosed. In one embodiment, the method may include capturing, using an optical detector, a first and a second image of one or more particles and capturing, using a video detector, a plurality of video frames of the one or more particles. Furthermore, in some embodiments, the method may include identifying, using the processor, a first image position of a particle in the first image of the one or more particles. In some embodiments, the method may include correlating, using the processor, the first image position of the particle in the first image to a second image position of the particle in the second image using the plurality of video frames.

In some embodiments, the method may include time stamping each of the images captured using the optical detector. Furthermore, the method may include time stamping each of the plurality of video frames captured using the video detector. The method may include using the time stamps in correlating, using the processor, the first image position of the particle in the first image to a second image position of the particle in the second image.

In some embodiments, the method may include transforming the identified first image position in the first image from a position in an image coordinate system to a position in a video frame coordinate system to identify a first video frame position. In addition, the method may include identifying a first video frame of the plurality of video frames with a time stamp that is closest to the time stamp of the first image. In some embodiments, the method may include identifying a particle with a position in the identified first video frame that is closest to the first video frame position. In some embodiments, the method may include tracking the movement of the particle from the first video frame to a second video frame to locate a second video frame position of the particle in the second video frame. In addition, the method may include inverse transforming the second video frame position in the video frame coordinate system to a position in the image coordinate system to identify a second image position in the second image.

In some embodiments, the method may include capturing, with the video detector, the plurality of video frames at a frame rate determined through a calibration routine. In some embodiments, the method may include storing the plurality of video frames in a storage device.

In some embodiments, the method may include capturing at least a third image of the one or more particles and correlating the first image position of the particle in the first image to a third image position of the particle in the third image using the plurality of video frames.

In some embodiments of the method the video detector has a frame rate that is at least 3 times faster than a frame rate of optical detector. In some embodiments, the video detector has a frame rate that is at least 3 times faster than a frame rate of optical detector.

In some embodiments, the particles may include two fluorophores, and the optical detector may be configured to capture the first image and the second image at different wavelengths corresponding to the two fluorophores. In addition, in some embodiments, the particles may include three fluorophores, and the optical detector may be configured to capture the first image, the second image, and the third image at different wavelengths corresponding to the three fluorophores.

An apparatus is also disclosed. In some embodiments, the apparatus may include an imaging region configured to hold one or more particles. Furthermore, the apparatus may include a light radiating device configured to illuminate the one or more particles in the imaging region. In some embodiments, the apparatus may include an optical detector configured to capture a first and second image of the one or more particles and a video detector configured to capture a plurality of video frames of the one or more particles. In addition, the apparatus may include a processor, coupled to the optical detector and the video detector, and configured to identify a first image position of a particle in the first image of the one or more particles. The processor may also be configured to correlate the first image position of the particle in the first image to a second image position of the particle in the second image using the plurality of video frames.

In some embodiments, the processor may be further configured to time stamp each of the images captured with the optical detector and time stamp each of the plurality of video frames captured with the video detector. In addition, in some embodiments, the processor may be further configured to transform the identified first image position in the first image from a position in an image coordinate system to a position in a video frame coordinate system to identify a first video frame position. Furthermore, the processor may be configured to identify a first video frame of the plurality of video frames with a time stamp that is closest to a time stamp of the first image and to identify a particle with a position in the identified first video frame that is closest to the first video frame position. The processor may be further configured to track the movement of the particle from the first video frame to a second video frame having a time stamp that is closest to a time stamp of the second image to locate a second video frame position of the particle in the second video frame. In addition, the processor may be configured to inverse transform the second video frame position in the second video frame from a position in the video frame coordinate system to a position in the image coordinate system to identify a second image position in the second image.

In some embodiments, the apparatus may include a dichroic mirror to separate light radiating from the light radiating device from light emitted from the particles in the imaging region. In some embodiments, the apparatus may include an optical component to focus the light radiated from the particles.

In some embodiments, the apparatus may include a filter positioned between the imaging region and the optical detector. The filter may be configured to permit light with a first wavelength to pass from the imaging plane, through the filter, and to the optical detector and to reflect or absorb light with a different wavelength than the first wavelength.

In some embodiments, the video detector may be configured to capture video frames at a rate that is at least three times faster than the optical detector captures images. In some embodiments, the video detector may be configured to capture video frames at a rate that is at least ten times faster than the optical detector captures images. In some embodiments, the processor may be configured to determine, through a calibration routine, the rate at which the video detector captures video frames.

In some embodiments, the processor may be configured to synchronize the optical detector and the video detector with one another in time using hardware mechanisms. In some embodiments, the processor may be configured to synchronize the optical detector and the video detector with one another in time using software mechanisms.

The apparatus of claim 10, where the imaging region is an imaging plane.

The apparatus of claim 10, where the imaging region is a three-dimensional volume.

In certain embodiments, the methods and apparatus disclosed herein use no more than one optical detector and no more than one video detector.

The term "coupled" is defined as connected, although not necessarily directly, and not necessarily mechanically.

The terms "a" and "an" are defined as one or more unless this disclosure explicitly requires otherwise.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Figure 1:
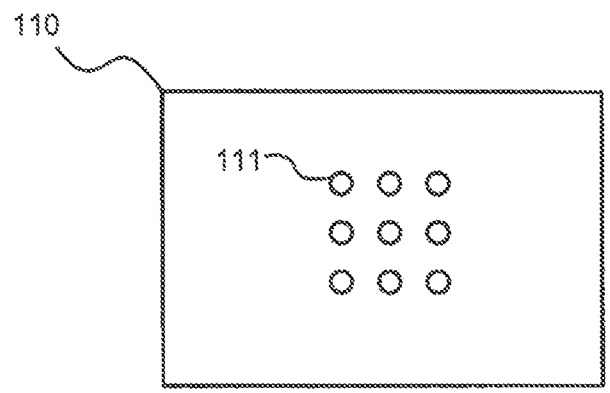
FIG. 1 is an illustration showing a result of random particle movement between two particle images captured at discrete time intervals.
Figure 1:
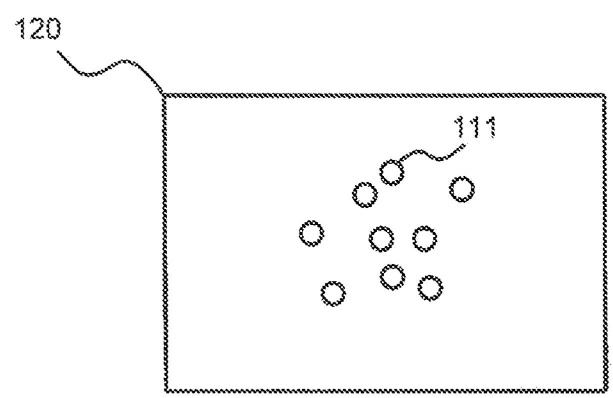
Figure 2:
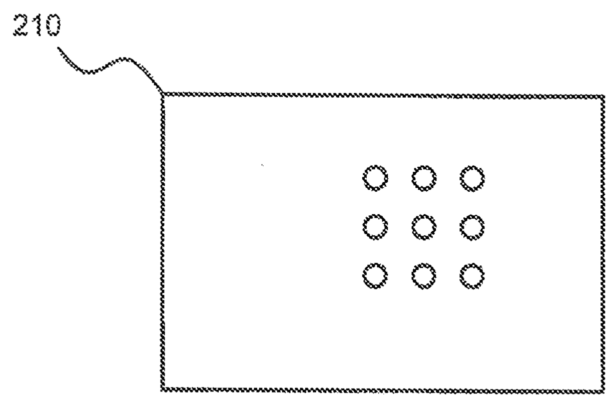
FIG. 2 is an illustration showing a result of uniform movement of particles between two images captured at discrete time intervals.
Figure 2:
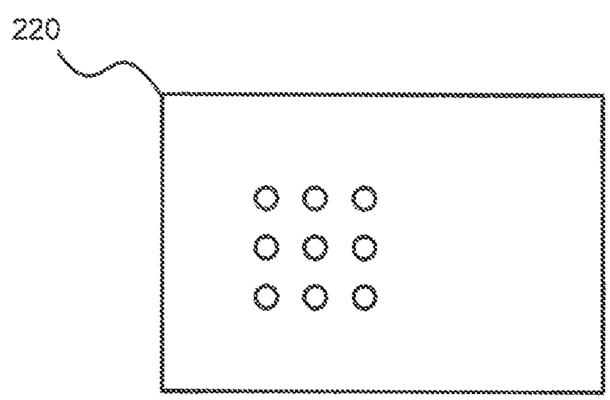

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those having ordinary skill in the art from this disclosure.

In the following description, numerous specific details are included to provide a thorough understanding of disclosed embodiments. One of ordinary skill in the art will recognize, however, that embodiments of the invention may be practiced without one or more of the specific details, or with other methods, components, materials, and so forth. In other instances, well-known structures, materials, or operations are not shown or described in detail to avoid obscuring aspects of the invention.

Although certain embodiments are described herein with respect to microspheres or beads, it is to be understood that the systems and methods described herein may also be used with other particles, including microparticles, gold nanoparticles, quantum dots, nanodots, nanoparticles, nanoshells, nanocrystals, droplets, rare-earth metal particles, magnetic particles, latex particles, cells, micro-organisms, vesicles, organelles, organic matter, non-organic matter, or any other discrete substances known in the art. The particles may be formed from a variety of substances including, latex, polystyrene, agarose, silica, glass, or dextran. In certain embodiments, the particles may be droplets formed as an emulsion, including for example, a water-in-oil emulsion or an oil-in-water emulsion. In particular embodiments, a droplet volume may be approximately 1-5 picoliters, 5-10 picoleters; 10-50 picoliters; 50-100 picoleters; 100-500 picoleters; 500-1,000 picoleters; 1,000-5,000 picoliters; 5,000-10,000 picoleters; 10,000-50,000 picoleters; 50,000-100,000 picoliters; 100,000-500,000 picoleters or 500,000-1,000,000 picoleters. In particular embodiments, a droplet volume may be approximately 1-5 femtoliters, 5-10 femtoliters; 10-50 femtoliters; 50-100 femtoliters; 100-500 femtoliters; 500-1,000 femtoliters; 1,000-5,000 femtoliters; 5,000-10,000 femtoliters; 10,000-50,000 femtoliters; 50,000-100,000 femtoliters; 100,000-500,000 femtoliters or 500,000-1,000,000 femtoliters. In certain embodiments, the droplet volume may be approximately 1.0-1.5 microliters; 1.5-2.0 microliters; 2.0-2.5 microliters; or 2.5-3.0 microliters. The particles may have optical properties including color, fluorescence, or chemiluminescence. The particles may serve as vehicles for molecular reactions. Examples of appropriate particles are illustrated and described in U.S. Pat. No. 5,736,330 to Fulton, U.S. Pat. No. 5,981,180 to Chandler et al., U.S. Pat. No. 6,057,107 to Fulton, U.S. Pat. No. 6,268,222 to Chandler et al., U.S. Pat. No. 6,449,562 to Chandler et al., U.S. Pat. No. 6,514,295 to Chandler et al., U.S. Pat. No. 6,524,793 to Chandler et al., and U.S. Pat. No. 6,528,165 to Chandler, which are incorporated by reference as if fully set forth herein. The systems and methods described herein may be used with any of the particles described in these patents. In addition, particles for use in method and system embodiments described herein may be obtained from manufacturers such as Luminex Corporation of Austin, Tex. The terms "beads" and "microspheres" are used interchangeably herein.

In addition, the types of particles that are compatible with the systems and methods described herein include particles with fluorescent materials attached to, or associated with, the surface of the particles. These types of particles, in which fluorescent dyes or fluorescent particles are incorporated into the particles in order to provide the classification fluorescence (i.e., fluorescence emission measured and used for determining an identity of a particle or the subset to which a particle belongs), are illustrated and described in U.S. Pat. No. 6,268,222 to Chandler et al. U.S. Pat. No. 6,649,414 to Chandler et al., and U.S. Pat. No. 7,718,262 to Chandler et al., which are incorporated by reference as if fully set forth herein. The types of particles that can be used in the methods and systems described herein also include particles having one or more fluorochromes or fluorescent dyes incorporated into the core of the particles.

Particles that can be used in the methods and systems described herein further include particles that will exhibit one or more fluorescent signals upon exposure to one or more appropriate light sources. Furthermore, particles may be manufactured such that upon excitation the particles exhibit multiple fluorescent signals, each of which may be used separately or in combination to identify the particles.

The methods described herein generally include analyzing one or more images of particles and processing data measured from the images to determine one or more characteristics of the particles such as, but not limited to, numerical values representing the magnitude of fluorescence emission of the particles at multiple detection wavelengths. Subsequent processing of the one or more characteristics of the particles, such as using one or more of the numerical values to determine a token ID representing the multiplex subset to which the particles belong and/or a reporter value representing a presence and/or a quantity of analyte bound to the surface of the particles, can be performed according to the methods described in U.S. Pat. No. 5,736,330 to Fulton, U.S. Pat. No. 5,981,180 to Chandler et al., U.S. Pat. No. 6,449,562 to Chandler et al., U.S. Pat. No. 6,524,793 to Chandler et al., U.S. Pat. No. 6,592,822 to Chandler, U.S. Pat. No. 6,939,720 to Chandler et al., U.S. Pat. No. 8,031,918 to Roth, which are incorporated by reference as if fully set forth herein. In one embodiment, the methods described herein can be used in a MagPix® instrument. The MagPix® instrument is a multiplexing platform with automated image processing software capable of measuring fluorescent intensity of up to 50 optically-distinct populations of magnetic beads randomly distributed in an imaging field.

Figure 3:
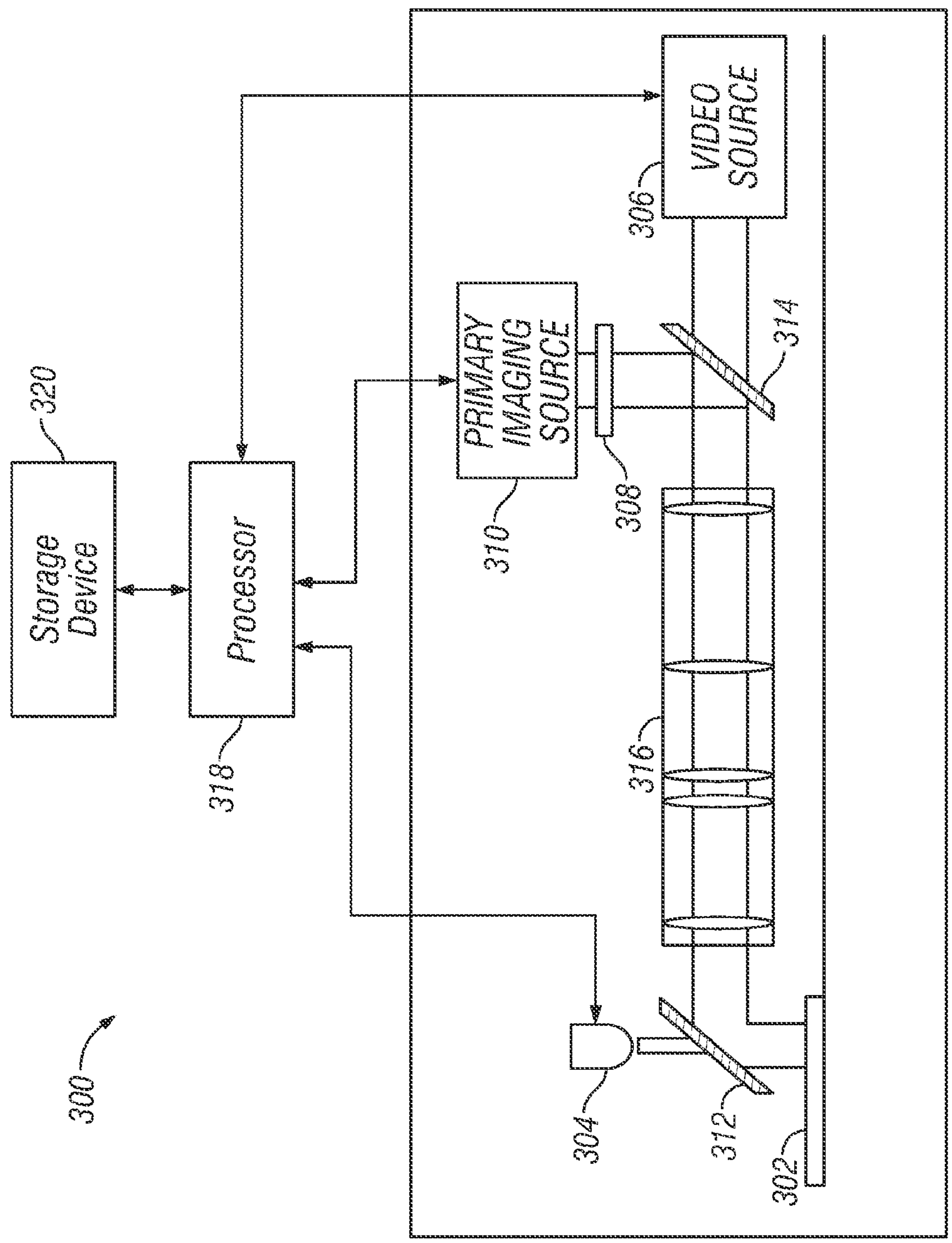
FIG. 3 is a schematic block diagram illustrating one embodiment of a particle imaging apparatus for tracking and correlating particles.

Turning now to the figures, FIG. 3 illustrates one embodiment of a particle imaging apparatus 300 for tracking and correlating particles. It should be noted that FIG. 3 is not drawn to scale and some elements of the system are not shown so as to not obscure the system in detail.

According to an embodiment, the particle imaging device 300 may include an imaging plane 302 configured to hold a plurality of particles, and a light radiating device 304 to illuminate the particles on the imaging plane 302. In one embodiment, the light radiating device 304 may be an infrared illuminator. In some embodiments, the light radiating device may be an LED, laser, or multispectral lamp. A dichroic mirror 312 may be used to separate the light radiating from the light radiating device 304 from the light emitted, and thus radiated, from the particles on the imaging plane 302 after being illuminated by the light radiating device 304.

The particle imaging device 300 may also include an optical detector 310 configured to capture a plurality of images of the particles on the imaging plane 302, and a video detector 306 configured to capture a plurality of video frames of the particles. The light radiating from the particles on the imaging plane 302 may be focused by an optical component 316, split by beam splitter 314, and directed to the optical detector 310 and the video detector 306. In order to produce more reliable images, for example, the particles may be at least partially immobilized on the imaging plane 302 prior to capturing an image with the optical detector 310 or a video frame with the video detector 306 of the particles.

The particle imaging device 300 may further include a filter 308 disposed between the imaging plane 302 and the optical detector 310 to filter the plurality of images prior to being captured by the optical detector 310. In some embodiments, the filter 308 may be configured to permit light with a first wavelength to pass from the imaging plane 302, through the filter 308, and to the optical detector 310, and to reflect or absorb light with a different wavelength than the first wavelength. This allows measurements to be performed on particles based on their fluorescence at a particular wavelength. In one embodiment, each image of the particles captured by the optical detector 310 may be an image of the particles at a particular wavelength. For example, a first image of the particles may show only particles that radiate light at a first wavelength, and a second image of the particles may show only particles that radiate light at a second wavelength. In some embodiments, a particle may radiate light at multiple wavelengths, and therefore may appear in multiple images of particles filtered at different wavelengths, such as the first and second images. Because one use of the video detector 306 may be to track and resolve the position of particles, the video detector may capture video frames of particles at more than one wavelength. As such, particles may be visible to the video detector even if they are not visible to the optical detector due to filtering. Therefore, a particle's position may be tracked using the video detector even if the particle does not emit light at a wavelength that reaches the optical detector.

The particle imaging device 300 may further include a processor 318 that is coupled to the optical detector 310 and the video detector 306, and that is configured to synchronize the optical detector 310 with the video detector 306. The processor 318 may synchronize, in time, the optical detector 310 with the video detector 306 by time stamping each of the plurality of images captured with the optical detector 310, and time stamping each of the plurality of video frames captured with a video detector 306. The processor 318 may also be configured to synchronize the optical detector 310 and the video detector 306 with one another in time using hardware, such as an electrical connection that carries a synchronizing pulse. In some embodiments, the video detector 306 may be the same type of detector as the image detector. However, in some embodiments, the video detector 306 may have less resolution than the image detector 310. Furthermore, the video detector 306 may be configured to capture video frames at a rate faster than the optical detector 310 captures images. By capturing video frames at a rate faster than images are captured by the optical detector 310, the video detector 306 may allow the processor to more closely track the movement of particles between the time instants when images are captured with the optical detector 310. For example, the video detector 306 may start capturing video frames when the first image is captured by the optical detector 310, and may continue capturing video frames at a faster rate than the optical detector 310 captures images until the optical detector 310 captures its last image of the particles. Because the video frames have less time between successive frames as compared to images taken with the optical detector, the movement of particles may be tracked using the relative locations of the measured particles. The rate at which the video frames are captured may be determined through numerous methods. For example, in one embodiment, the processor 318 may be configured to determine the rate at which the video detector 306 captures video frames through a calibration routine. Such a calibration routine may, for example, acquire video frames at different frame rates and determine a minimum frame rate that allows for accurate tracking of particles given the amount and type of movement of the particles. The frame rate may then be increased by a predetermined amount to ensure that particles are accurately tracked. In another embodiment, the processor 318 may be configured to determine the rate at which the video detector 306 captures video frames based on known design characteristics, in which case the rate is predetermined to be sufficiently fast to accurately capture particle movement. For example, in some embodiments, the video frame rate may be three times the rate at which images are captured, which would allow for two video frames between two image captures. In some embodiments, the video frame rate may be ten times as fast as the frame rate of the image detector, which would provide nine video frames between two image captures. Larger video frame rates may allow for better tracking of particles, but may also require more processing and storage resources. The particle imaging device 300 may also include a storage device 320 to store the plurality of video frames captured by the video detector 306 and/or the images captured by the optical detector 310.

The processor 318 may also be configured to identify a first image position $I_{p1}$ of a particle X in a first image $I_1$ captured by the optical detector 310, and to correlate the first image position $I_{p1}$ of the particle X to a second image position $I_{p2}$ of the particle X in a second image $I_2$ captured by the optical detector 310 using the plurality of video frames. Locations in an image captured by an optical detector 310 may be specified in an image coordinate system and locations in a video frame captured by a video detector 306 may be specified in a video frame coordinate system. For example, if the video detector 306 has less resolution than the optical detector 310, different coordinate systems may be used to describe locations (or particle positions) in images taken by the two detectors. A particle may show up in both images, but may have different coordinates in the two images because the two images have different resolution, and therefore different coordinate systems. The processor 318 may be configured to transform the identified first image position $I_{p1}$ in the first image $I_1$ from a position in the image coordinate system to a position in the video frame coordinate system. By transforming the location coordinates from the image coordinate system to the video frame coordinate system, a first video frame position $F_{p1}$ may be identified, wherein the first video frame position $F_{p1}$ is the position in a video frame that corresponds to the first image position $I_{p1}$ in an image.

In order to correlate particles from separate images captured by the optical detector 310, the relevant video frames may be analyzed. For example, the relevant video frames may be the video frames that are captured approximately between the time that the first image $I_1$ is captured by the optical detector 310 and the time that the second image $I_2$ is captured. The relationship between the first image $I_1$ and the second image $I_2$ captured by the optical detector 310 may not be critical because the first and second images, $I_1$ and $I_2$ respectively, only distinguish that the first image $I_1$ and the second image $I_2$ are two separate images captured by the optical detector 310. For example, the second image $I_2$ may be the fourth image captured by the optical detector 310 after the first image $I_1$ was captured. As another example, the second image $I_2$ may be captured before the first image $I_1$ is captured, which may be the case if data is processed after the images are taken and the processor uses an image taken later in time as a starting point. Nevertheless, the most relevant video frame to the first image $I_1$ may be the video frame that is captured within the shortest amount of time either before or after the first image $I_1$ was captured. Therefore, the processor 318 may be further configured to identify a first video frame $F_1$, of the plurality of video frames captured by the video detector 306, with a time stamp that is closest to the time stamp of the first image $I_1$ captured by the optical detector 310.

In order to track the movement of a particular particle X using the video frames, the particle X may be identified in the first video frame $F_1$. Therefore, the processor 318 may also be configured to identify a particle Y with a position in the identified first video frame $F_1$ that is closest to the first video frame position $F_{p1}$. A particle Y in the first video frame $F_1$ may be the same particle as particle X in the first image $I_1$, therefore particle X and particle Y will hereinafter be referred to as particle X. To track the movement of particle X from the time when the first image $I_1$ was captured to the time when the second image $I_2$ was captured, the processor 318 may be configured to track the movement of particle X from the first video frame $F_1$ to a second video frame $F_2$ to locate a second video frame position $F_{p2}$ of particle X in the second video frame $F_2$. In an embodiment, the second video frame $F_2$ may be a video frame with a time stamp that is closest to the time stamp of the second image $I_2$ captured by the optical detector 310, even if addition video frames were taken between the first video frame $F_1$ and the second video frame $F_2$. Tracking the movement of particle X may, in some embodiments, include tracking particle X in successive video frames either in real time or in software post-processing step performed by the processor.

With the second video frame position $F_{p2}$ of the particle X identified, the processor 318 may be configured to inverse transform the second video frame position $F_{p2}$ in the second video frame $F_2$ from a position in the video frame coordinate system to a position in the image coordinate system to identify a second image position $I_{p2}$ of particle X in the second image $I_2$. By transforming the location coordinates from the video frame coordinate system back to the image coordinate system, the second image position $I_{p2}$ of particle X in the second image $I_2$ may be identified as the position of the particle in the second image $I_2$ that is closest to the second image position $I_{p2}$ for particle X that was identified from the inverse transform operation.

Figure 4:
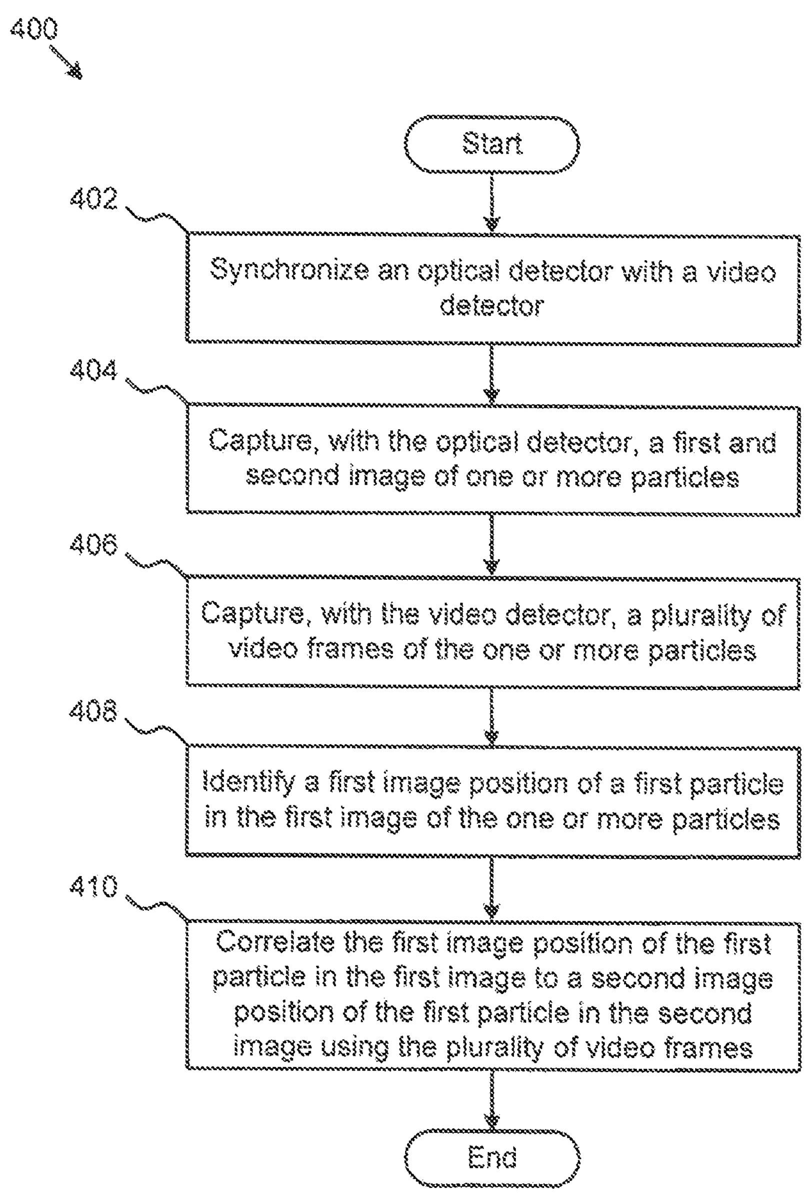
FIG. 4 is a flow chart illustrating one embodiment of a method for tracking and correlating particles.
Figure 6A:
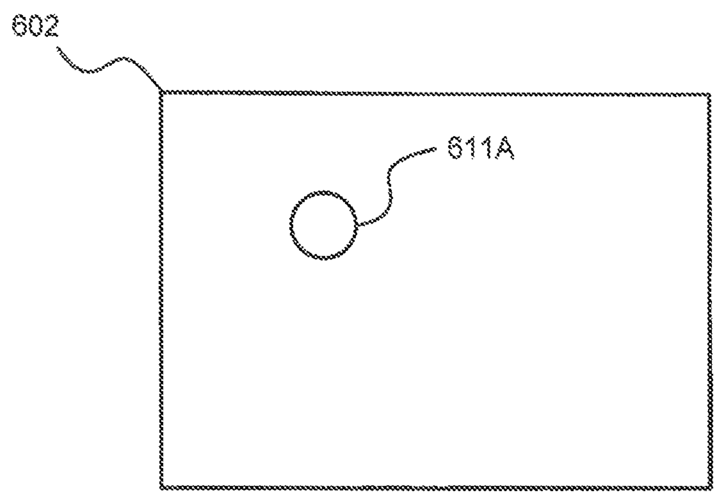
FIGS. 6A and 6B are illustrations showing a result of two particle images of a particle.
Figure 6B:
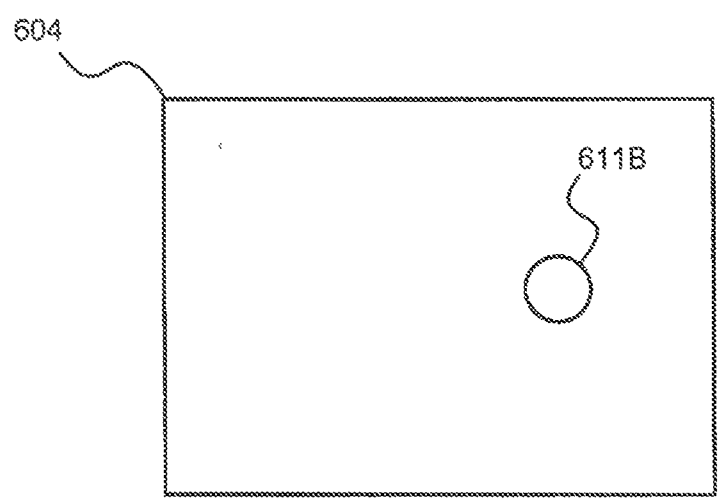

FIG. 4 is a flow chart illustrating one embodiment of a method 400 for tracking and correlating particles. A preferred embodiment to implement the method 400 of FIG. 4 may be the apparatus disclosed in FIG. 3, although one skilled in the art will readily recognize that other embodiments and apparatuses may also be used to implement the method 400 of FIG. 4 without departing from the scope or spirit of this disclosure. At block 402, an optical detector may be synchronized, by a processor, with a video detector. At block 404, the optical detector may be used to capture a first and a second image of one or more particles. For example, FIGS. 6A and 6B are illustrations showing a first image 602 and a second image 604 of a particle 611 captured by an optical detector. The first and second images, 602 and 604 respectively, may be images of a particle 611 captured by an optical detector at discrete time intervals. Therefore, 602 may be, for example, the first image of the particle 611, and 604 may be the second image of the particle 611 taken at a later time than the first image. From FIG. 6A and FIG. 6B it is evident that during the time between when the first image was captured and when the second image was captured, the particle moved from a location 611A in the first image 602 to a location 611B in the second image 604. As discussed previously, the first image 602 and the second image 604 may be images that have been filtered prior to being captured by the optical detector to show particle 611 at distinct fluorescent wavelengths.

Figure 6C:
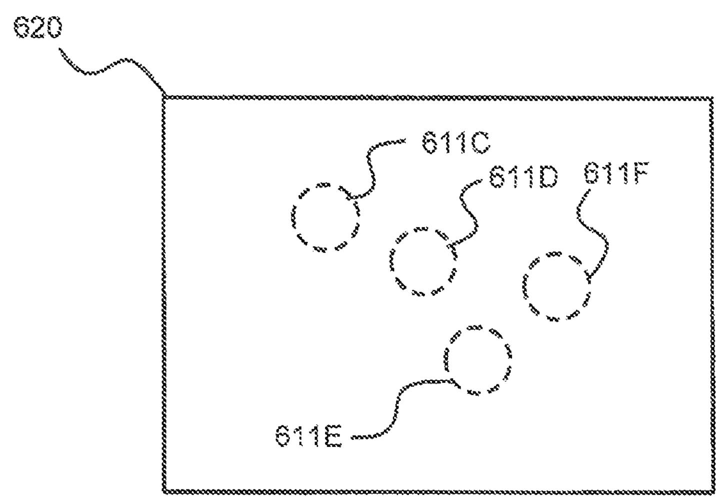
FIG. 6C is an illustration showing a result of a plurality of video frame positions of a particle overlaid on one another.

To track the movement of particle 611 as it moves from its location 611A in the first image 602 to its location 611B in the second image 604, at block 406, a plurality of video frames of the one or more particles may be captured with the video detector. For example, FIG. 6C is an illustration showing a plurality of video frame positions 611C-611F of particle 611 overlaid on one another to show the movement of particle 611 over time. The plurality of video frame positions 611C-611F may show successive video frame positions of particle 611 as captured in distinct video frames with the video detector. For example, the video frame position 611D may be the position of particle 611 in a video frame captured at a time after the video frame that shows the particle 611 at video frame position 611C was captured. Therefore, video frame position 611C may be the first video frame position of particle 611 captured with the video detector, video frame position 611D may be the second video frame position of particle 611 captured, video frame position 611E may be the third video frame position of particle 611 captured, and so on.

To identify a particle of interest that may be tracked using a plurality of video frames, a first image position of a first particle in the first image 602 of the one or more particles may, at block 408, be identified. For example, the first particle may be particle 611 from the first image 602, and its first image position may be 611A. With the particle of interest identified as particle 611, the first image position 611A of a first particle 611 in the first image 602 may, at block 410, be correlated to a second image position of the first particle 611 in the second image using the plurality of video frames. For example, the second image may be the second image 604 of FIG. 6B, the second image position may be 611B of FIG. 6B, and the plurality of video frames used to correlate the first image position 611A from the first image 602 to the second image position 611B from the second image 604 may be the plurality of video frames that capture particle 611 at the plurality of video frame positions 611C-611F.

Figure 5:
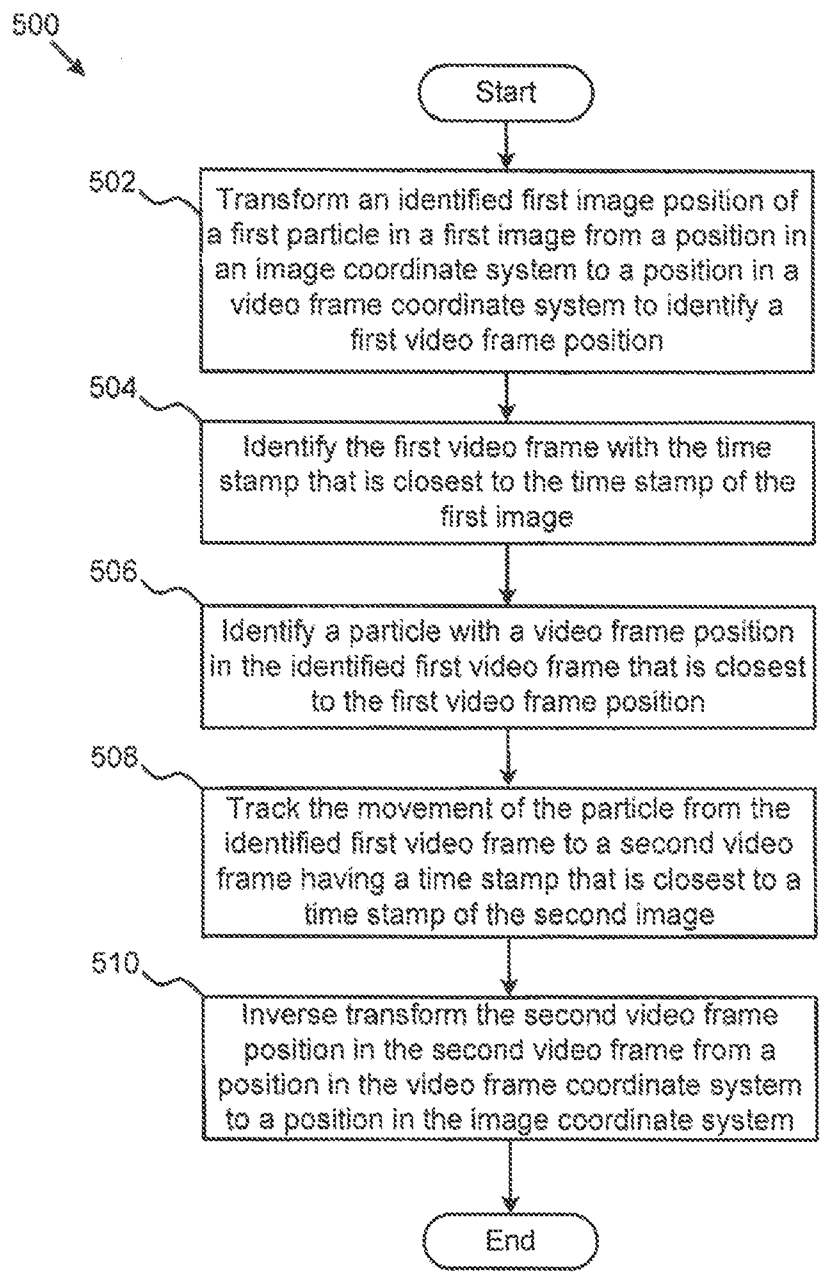
FIG. 5 is a flow chart illustrating another embodiment of a method for tracking and correlating particles.

FIG. 5 is a flow chart illustrating an embodiment of a method 500 for tracking and correlating particles. More specifically, method 500 provides an example of a method that may be used to correlate the first image position 611A of a first particle 611 in the first image 602 to a second image position 611B of the first particle 611 in the second image 604 using the plurality of video frames that capture particle 611 at the plurality of video frame positions 611C-611F. In order to ensure that the particle being tracked using a plurality of video frames corresponds to particle 611 in the first image 602, the identified first image position 611A of a first particle 611 in a first image 602 may, at block 502, be transformed from a position in an image coordinate system to a position in a video frame coordinate system. By doing so, the first video frame position in a video frame that corresponds to the first image position 611A of particle 611 in a first image 602 may be identified.

At block 504, a first video frame with the time stamp that is closest to the time stamp of the first image 602 may be identified. For example, the video frame that captures particle 611 at position 611C may be identified as the first video frame with the time stamp that is closest to the time stamp of the first image 602. At block 506, a particle with a video frame position in the identified first video frame that is closest to the first video frame position may be identified. For example, the particle identified at block 506 may be particle 611 because the video frame position 611C of particle 611, which was captured by the first video frame identified at block 504, is closest to the first video frame position identified at block 502. Therefore, because the particle identified at block 506 may, in some embodiments, also be the same particle as particle 611, except in the video frame coordinate system as opposed to in the image coordinate system, the particle identified at block 506 will hereinafter be referred to as particle 611 as well. This is a desired result because the particle 611 being tracked with the plurality of video frames should be the same as the particle 611 identified in the first image 602 so that the particle's second image position 611B in a second image 604 may be correlated with the first image position 611A of the particle 611 in the first image 602.

The movement of particle 611 may, at block 508, be tracked from the first video frame to a second video frame to locate a second video frame position of the particle 611 in the second video frame. In some embodiments, particles may be tracked by using absolute locations in a sequence of images and assuming that each particle in an image that is closest to the position of a particle in previous image corresponds to the same particle. If the sample rate of the video image is fast enough, such assumption should be true. Referring to FIG. 6, the particle 611 may be tracked from the video frame that captured particle 611 at position 611C to the video frame that captured particle 611 at position 611F. Therefore, the video frame that captures particle 611 at position 611F may be identified as the second video frame and position 611F of particle 611 may be the second video frame position. In one embodiment, the second video frame may be a video frame with a time stamp that is closest to the time stamp of the second image 604 captured by the optical detector. With the video frame position of particle 611 identified within the second video frame, at block 510, the second video frame position 611F in the second video frame may be inverse transformed from a position in the video frame coordinate system to a position in the image coordinate system to identify a second image position in the second image 602. The second image position identified at block 510 as a result of inverse transforming may or may not be located at the exact same location as the second image position 611B of particle 611 in the second image 604 captured by the optical detector. However, the second image position identified at block 510 may be the closest position of any particle of the second video frame when the positions of the particles in the second video frame are inverse transformed to obtain image positions corresponding to the video frame positions of the particles in the second video frame. Therefore, the second image position 611B of particle 611 in the second image 604 may be identified using the plurality of video frames because the second image position 611B may be the closest position of any particle in the second image to the image coordinate system position determined from inverse transforming the second video frame position 611F.

Figure 7A:
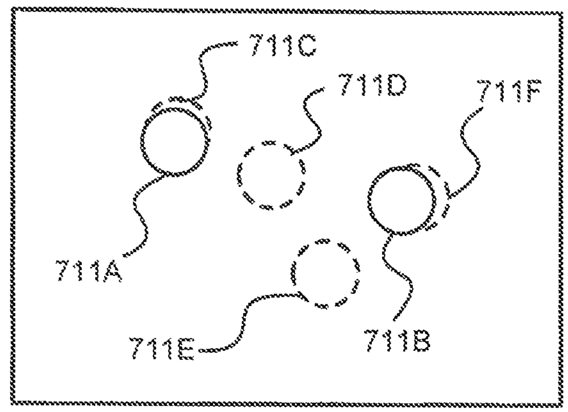
FIGS. 7A-7B are illustrations showing the result of two particle image positions and a plurality of video frame positions of a particle overlaid on one another.

FIG. 7A is an illustration showing two particle image positions and a plurality of video frame positions of a particle overlaid on one another to illustrate one embodiment of methods 400 and 500. Particle 711 may be identified in a first image captured by an optical detector, and the first image position of particle 711 may be identified as position 711A. The first image position 711A may be transformed from an image coordinate system position to a video frame coordinate system position to identify a first video frame position. Video frame positions 711C-711F may be successively captured with a video detector that may be synchronized with the optical detector. Using the time stamps of the images and video frames, the video frame that captures a particle at video frame position 711C may be identified as the video frame with a time stamp that is closest to the time stamp of the first image that captured particle 711 at first image position 711A. Video frame position 711C may be identified as the video frame position closest to the transform-identified first video frame position, and therefore the particle located at video frame position 711C may be identified as the particle to track with the plurality of video frames. This particle is the same particle as particle 711 from the first image, except that it is in the video frame coordinate system. The movement of the particle may be tracked successively from the video frames that capture the particle at video frame positions 711C-711F. The video frames may continue to be tracked from the first video frame until a second video frame, which has a time stamp, among a plurality of video images, closest to a second image captured by the optical detector, is identified. The tracked particle's second video frame position 711F in the second video frame may be inverse transformed to identify the second image position of particle 711 in the second image captured by the optical detector. The particle with a position, in the second image captured by the optical detector, closest to the identified second image position from the inverse transform operation may be identified as the particle 711 in the second image, thus correlating the first image position 711A of particle 711 in the first image to a second image position 711B of the particle in the second image.

Figure 7B:
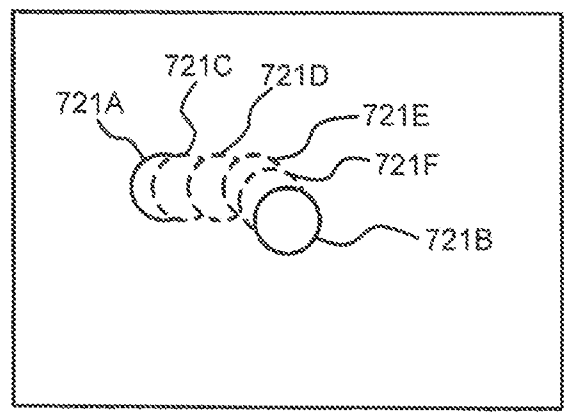

FIG. 7B shows an embodiment where, as compared to FIG. 7A and particle 711, either the particle 721 moves less between positions 721A and 721B or where the sample rates of images 721A-B, and video frames 711C-F, are faster. As seen in FIG. 7B, video frame position 711C is closest to image position 721A. The particle 721 is then tracked in video frame positions 721C-F. Finally, video frame position 721F is used to identify the second image position 721B of the particle 721. As such, a measurement of particle 721 in the first image position 721A and a measurement of the particle 721 in the second image position 721B can be associated with the same particle even though particle 721 has moved during the time between the two images were taken.

Figure 8:
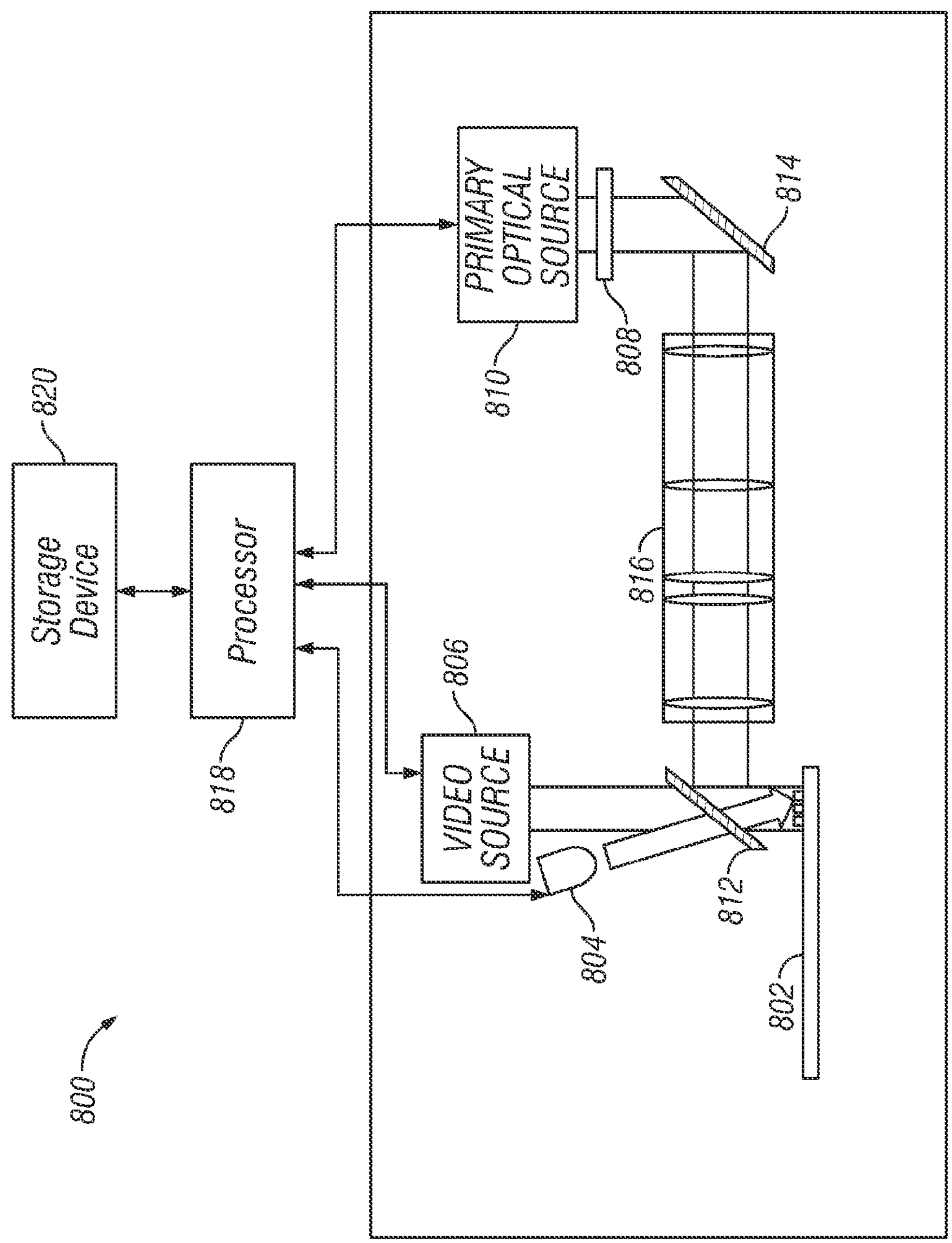
FIG. 8 is a schematic block diagram illustrating an embodiment of a particle imaging apparatus for tracking and correlating particles.

FIG. 8 is a schematic block diagram illustrating another embodiment of a particle imaging apparatus 800 for tracking and correlating microsphere particles. As with FIG. 3, it should be noted that FIG. 8 is not drawn to scale and some elements of the system are not shown so as to not obscure the system in detail. The imaging plane 802, light radiating device 804, video detector 806, filter 808, optical detector 810, beam splitter 812, mirror 814, optical component 816, processor 818, and storage device 820 of particle imaging apparatus 800 function in a similar manner as the imaging plane 302, light radiating device 304, video detector 306, filter 308, optical detector 310, dichroic mirror 312, beam splitter 314, optical component 316, processor 318, and storage device 320 of particle imaging apparatus 300 in FIG. 3 in that both the video detector and image detector can image the same particles simultaneously. Whereas the particle imaging apparatus 300 of FIG. 3 places a dichroic mirror 312 on the side of the optical component 316 where the optical detector 310 is located (camera side), the particle imaging apparatus 800 of FIG. 8 utilizes a beam splitter 814 on the side of the optical component 816 where the light radiating device 804 is located (object side). Therefore the image detector 810 in FIG. 8 may have its own optics separate from the optics of the video detector 806.

Figure 9:
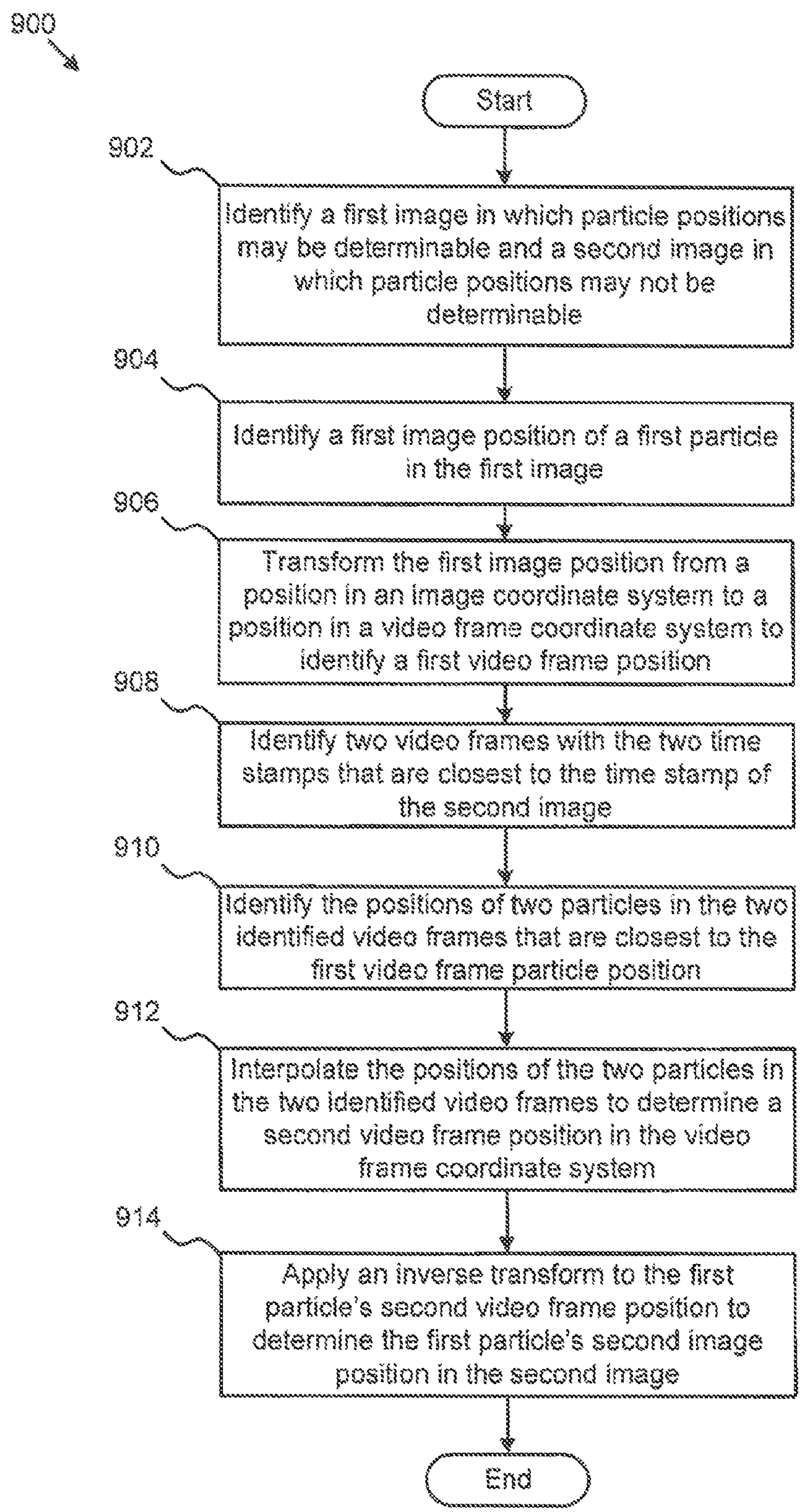
FIG. 9 is a flow chart illustrating an embodiment of a method for tracking and correlating particles.

FIG. 9 is a flow chart illustrating one embodiment of a method 900 for tracking and correlating microsphere particles. Preferred embodiments to implement the method 900 of FIG. 9 may be the apparatuses disclosed in FIG. 3 or FIG. 8, although one skilled in the art will readily recognize that other embodiments and apparatuses may also implement the method 900 of FIG. 9 without departing from the scope or spirit of this disclosure. The method 900 may be suitable for scenarios in which two images are captured by the optical detector as before, except that the position of particles in the second image may not be determinable. For example, if a particle does not emit fluorescent light at a particular wavelength (or emits an unappreciable amount of light at that wavelength), and the filter 808 only transmits light having that same wavelength, the image detector 810 may not see the particle's fluorescence. The method may begin at block 902 where a first image and a second image are identified. The first image and the second image may be images captured by an optical detector at discrete time intervals. The position of particles in the first image may be determinable, but the position of particles in the second image may or may not be determinable. At block 904, a first image position of a first particle in the first image may be identified. The first particle for which the first image position was identified at block 904 may be a particle for which measurements may be sought, and therefore the position of the first particle in multiple images may be determined in order to collect data from measurements performed on multiple images of the first particle. At block 906, the first image position may be transformed from a position in an image coordinate system to a position in a video coordinate system to identify a first video frame position in a first video frame. The first video frame may be a video frame captured by a video detector at a time closest to the time when the first image was captured by the optical detector. As before, a particle may be identified in the first video frame that has a position in the first video frame that is closest to the first video frame position identified at block 906 as a result of the transform operation. The particle identified in the first video frame may be the first particle, and the first particle may be tracked in successive video frames that are captured by the video detector. As disclosed in connection with FIG. 3 and FIG. 5, the optical detector and the video detector may be synchronized in time to aid in identifying the relevant video frames to track the movement of the particle. Each of the images captured by the optical detector and each of the video frames captured by the video detector may be time stamped to identify the temporal relationship between images and video frames. The first particle may be continuously tracked using video frames that are continuously being captured until approximately a time that a second image is captured by the optical detector. Although in some embodiments the first image and the second image will be taken consecutively, in some embodiments, one or more images may be taken between the first and second image.

For the second image captured by the optical detector, two video frames with two time stamps that are closest to the time stamp of the second image may, at block 908, be identified. For each of the two video frames identified at block 908, the video frame position of a particle that is closest to the first video frame position in each of the two video frames may, at block 910, be identified. The video frame position of the two particles in each of the two video frames captured at block 908 may, at block 912, be interpolated to determine the first particle's second video frame position in the video frame coordinate system. At block 914, an inverse transform may be applied to the second video frame position to determine the first particle's image position in the second image. The first particle's image position in the second image may be established as the position of a particle in the second image that is closest to the image position that was a result of the inverse transform operation at block 914. However, because images taken by the image detector may be filtered (only certain wavelengths allowed to reach the detector) the first particle may not show up in the second image. However, because the location in the second image is known, the fact that the particle does not emit light that is being captured in the second image can be known and that information can be attributed to the first particle. In some embodiments, if no particle is found within a predetermined radius of an expected location of a particle in an image, it may be determined that that particle does not emit light in the wavelength being detected. By determining the first particle's second image position and the first particle's first image position, information about that particle taken in the first and second images may be correlated (even if the particle does not show up in one of the images).

The methods and apparatus described herein are generally described as being implemented with particles in an imaging plane. However, the methods and apparatus may also be used with particles in other imaging regions. For example, imaging regions may include three dimensions regions or volumes, such as a droplet or a microwell. In addition, multiple detectors may be used with the methods described herein. For example, two or more video detectors placed at different locations may be used to track the positions of particles moving in three dimensions. That tracking information may then be used to associate measurements taken by one or more optical detectors, at different times, to a particular particle.

In some embodiments, tangible computer-readable media, such as CDs, hard-disks, RAM, or Flash memory, for example, may be made, recorded or written to with instructions, that when executed by a processor, are capable of performing the methods described herein.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. For example, the methods disclosed herein may be applied in real time as information is being gathered, or it can be performed after all measurements have been taken in a post-processing step. In addition, modifications may be made to the disclosed apparatus, and components may be eliminated or substituted for the components described herein where the same or similar results would be achieved. All such similar substitutes and modifications apparent to those skilled in the art are deemed to be within the spirit, scope, and concept of the invention as defined by the appended claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present processes, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:

capturing, using an optical detector, a first and a second image of one or more particles;

capturing, using a video detector, a plurality of video frames of the one or more particles;

time stamping the first and second images captured using the optical detector;

time stamping the plurality of video frames captured using the video detector;

identifying, using the processor, a first image position of a particle in the first image of the one or more particles;

correlating, using the time stamps and a processor, the first image position of the particle in the first image to a second image position of the particle in the second image using the plurality of video frames;

transforming the identified first image position of the particle in the first image from a position in an image coordinate system to a position in a video frame coordinate system to identify a first video frame position;

identifying a first video frame of the plurality of video frames with a time stamp that is closest to a time stamp of the first image;

identifying a particle with a position in the identified first video frame that is closest to the first video frame position;

tracking the movement of the particle from the first video frame to a second video frame to locate a second video frame position of the particle in the second video frame; and inverse transforming the second video frame position in the video frame coordinate system to a position in the image coordinate system to identify a second image position of the particle in the second image.

2. The method of claim 1, wherein the video detector captures the plurality of video frames at a frame rate determined through a calibration routine.

3. The method of claim 1, further comprising capturing at least a third image of the one or more particles, and correlating the first image position of the particle in the first image to a third image position of the particle in the third image using the plurality of video frames.

4. The method of claim 1, wherein the video detector has a frame rate that is at least three times faster than a frame rate of optical detector.

5. The method of claim 1, wherein the one or more particles comprises two fluorophores, and the optical detector is configured to capture the first image and the second image at different wavelengths corresponding to the two fluorophores.

6. The method of claim 5 wherein the one or more particles comprises three fluorophores, and the optical detector is configured to capture the first image, the second image, and a third image at different wavelengths corresponding to the three fluorophores.

7. An apparatus, comprising:

an imaging region configured to hold one or more particles;

a light radiating device configured to illuminate the one or more particles in the imaging region;

an optical detector configured to capture a first and second image of the one or more particles;

a video detector configured to capture a plurality of video frames of the one or more particles; and a processor, coupled to the optical detector and the video detector, configured to:

identify a first image position of a particle in the first image of the one or more particles;

correlate the first image position of the particle in the first image to a second image position of the particle in the second image using the plurality of video frames;

transform the identified first image position of the particle in the first image from a position in an image coordinate system to a position in a video frame coordinate system to identify a first video frame position;

identify a first video frame of the plurality of video frames with a time stamp that is closest to a time stamp of the first image;

identify a particle with a position in the identified first video frame that is closest to the first video frame position;

track the movement of the particle from the first video frame to a second video frame having a time stamp that is closest to a time stamp of the second image to locate a second video frame position of the particle in the second video frame; and inverse transform the second video frame position in the second video frame from a position in the video frame coordinate system to a position in the image coordinate system to identify a second image position of the particle in the second image.

8. The apparatus of claim 7, wherein the processor is further configured to time stamp each of the images captured with the optical detector and time stamp each of the plurality of video frames captured with the video detector.

9. The apparatus of claim 7, further comprising:

a dichroic mirror to separate light radiating from the light radiating device from light emitted from the particles in the imaging region; and an optical component to focus the light radiated from the particles.

10. The apparatus of claim 7, further comprising a filter positioned between the imaging region and the optical detector, where the filter is configured to:

permit light with a first wavelength to pass from the imaging plane, through the filter, and to the optical detector; and reflect or absorb light with a different wavelength than the first wavelength.

11. The apparatus of claim 7, wherein the video detector is configured to capture video frames at a rate that is at least three times faster than the optical detector captures images.

12. The apparatus of claim 7, wherein the processor is configured to determine, through a calibration routine, the rate at which the video detector captures video frames.

13. The apparatus of claim 7, wherein the processor is further configured to synchronize the optical detector and the video detector with one another in time using hardware mechanisms.

14. The apparatus of claim 7, wherein the processor is further configured to synchronize the optical detector and the video detector with one another in time using software mechanisms.

15. The apparatus of claim 7, where the imaging region is an imaging plane.

16. The apparatus of claim 7, where the imaging region is a three-dimensional volume.

17. A non-transitory computer-readable medium containing instructions, which when executed by a processor, cause the processor to perform the steps comprising:

capturing, using an optical detector, a first and a second image of one or more particles;

capturing, using a video detector, a plurality of video frames of the one or more particles;

identifying, using the processor, a first image position of a particle in the first image of the one or more particles;

correlating, using the processor, the first image position of the particle in the first image to a second image position of the particle in the second image using the plurality of video frames;

transforming the identified first image position of the particle in the first image from a position in an image coordinate system to a position in a video frame coordinate system to identify a first video frame position;

identifying a first video frame of the plurality of video frames with a time stamp that is closest to a time stamp of the first image;

identifying a particle with a position in the identified first video frame that is closest to the first video frame position;

tracking the movement of the particle from the first video frame to a second video frame to locate a second video frame position of the particle in the second video frame; and inverse transforming the second video frame position in the video frame coordinate system to a position in the image coordinate system to identify a second image position of the particle in the second image.

* * * * *